United States Patent
Li

[11] Patent Number: 6,026,719
[45] Date of Patent: Feb. 22, 2000

[54] METHOD OF BREAKING CHIPS AND APPARATUS THEREFOR

[76] Inventor: Xiao Ping Li, Apt Blk 12, Hill View Avenue #13-1404, Singapore, Singapore, 660012

[21] Appl. No.: 08/731,094

[22] Filed: Oct. 9, 1996

[51] Int. Cl.[7] .................................................. B23B 1/00
[52] U.S. Cl. .............................. 82/1.11; 407/2; 407/4; 407/10; 407/115
[58] Field of Search ................. 82/1.11; 407/2, 407/3, 4, 5, 6, 7, 8, 9, 10, 114, 115

[56] References Cited

U.S. PATENT DOCUMENTS

| | | | |
|---|---|---|---|
| 899,608 | 9/1908 | Newbold | 407/8 |
| 1,021,868 | 4/1912 | Hartness | 407/2 |
| 3,172,190 | 3/1965 | Beach | 407/4 |
| 3,673,653 | 7/1972 | Kaser | 29/96 |
| 4,214,845 | 7/1980 | Mori | 407/114 |
| 4,834,592 | 5/1989 | Niebauer et al. | 407/115 X |
| 4,957,396 | 9/1990 | Niebauer | 407/115 X |
| 4,978,260 | 12/1990 | Lynde et al. | 407/2 X |
| 5,193,947 | 3/1993 | Bernadic et al. | 407/114 |

FOREIGN PATENT DOCUMENTS

| | | | |
|---|---|---|---|
| 275825 | 2/1990 | German Dem. Rep. | |
| 0275825 | 2/1990 | Germany | 407/6 |
| 1704939 | 1/1992 | Russian Federation | |
| 139242 | 4/1930 | Switzerland | 407/3 |
| 547 143 | 3/1974 | Switzerland | |
| 547143 | 3/1974 | Switzerland | |
| 1308366 | 2/1973 | United Kingdom | |
| WO 9427769 | 12/1994 | WIPO | |
| WO 9511102 | 4/1995 | WIPO | |

OTHER PUBLICATIONS

Search Report; PCT/SG96/00018; Lebzeltern; Jan. 31, 1997.

*Primary Examiner*—Andrea L. Pitts
*Assistant Examiner*—Henry W. H. Tsai
*Attorney, Agent, or Firm*—Fish & Richardson P.C.

[57] ABSTRACT

A method of breaking chips is disclosed in which the chip generated during cutting is broken into small pieces by increasing the shear strain at the shear plane, which is the joint between the chip and the workpiece, until fracture occurs at the shear plane. This is achieved by forming the chip (1) generated during cutting into a lever, in which the head (11) of the chip is the load-lifting point receiving a force from a first plane (9), the contact between the chip (1) and a second plane (12) of the chip breaker is the fulcrum, and the root (8) of the chip, which joins the chip to the shear plane, is the force-exerting point exerting a force additional to the shear force acting along the shear plane to strain the material until fracture occurs at the shear plane.

4 Claims, 12 Drawing Sheets

METHOD OF BREAKING CHIPS AND APPARATUS THEREFOR

FIELD OF THE INVENTION

This invention relates to a method of breaking chips in metal cutting and a chip breaker for use in the method.

BACKGROUND OF THE INVENTION

In metal cutting, particularly in lathing of ductile materials, continuous chips are usually generated. Such continuous chips cause serious difficulties in operational safety, chip disposal and quality control of the machined workpiece surface. More seriously, continuous chips can cause unpredictable jams in the cutting process, which prevent automation of machining systems. Therefore, in metal cutting it is strongly desired to have the chips generated in discontinuous forms. Chip breakers for metal cutting processes are devices used for breaking chips into small pieces. Two types of chip breakers have been proposed in the prior art—obstruction devices separate from a tool insert, and combinations of grooves and obstacles formed on the rake face of the tool insert. During metal cutting processes, such chip breakers work to bend the chip after it has been generated. These chip breakers do not make sure that the chip is broken during cutting and chip breaking can be achieved only in some machining conditions. It is very difficult to predict whether the chip will be broken by these chip breakers from a set of given machining conditions, that is, when these chip breakers are used in metal cutting, it is uncertain that the chip will break. Further, when chips are broken by such chip breakers, the chips usually fly in many directions and these still cause difficulties in operational safety, control of machined workpiece surface quality and chip disposal. Furthermore, some of these chip breakers weaken the tool cutting edge and consequently shorten the tool life. Typical examples of existing chip breakers may be seen in patent specifications numbers U.S. Pat. No. 5,193,947, SU 1704939, WO 9427769 and WO 9511102.

OBJECT OF THE INVENTION

It is the primary object of the invention to provide an improved method of chip breaking in metal cutting and apparatus for performing the method.

SUMMARY OF THE INVENTION

According to the invention in the first aspect there is provided a method of breaking chips in a metal cutting process comprising the step of increasing shear strain at the shear plane of chip formation until fracture of a said chip occurs at the shear plane irrespective of machining conditions.

According to the invention in a second aspect, there is provided a method of breaking chips in a metal cutting process in which a chip is parted from a workpiece at a shear plane of chip formation, the method comprising the step of forming a chip into a lever for exerting a force to increase shear strain at the shear plane until fracture occurs at the shear plane.

In third and fourth aspects of the invention, apparatus for breaking chips in a metal cutting process is provided for performing the methods of the first and second aspects.

Further features of the invention may be found in the appended claims.

In the described embodiments of the invention, a shear plane fracturing method for chip breaking in metal cutting is disclosed. In this method, the chips generated in metal cutting are broken by increasing the shear stress and thus strain at the shear plane of chip formation until fracture occurs at the shear plane. A leverage chip breaking approach is also disclosed in which the chip is forced to break into small pieces by a process which forms the chip as soon as it has been generated from the shear plane into a lever of curled form, in which the head of the chip is the load-lifting point receiving force from a fixed body, the contact between the chip and the pivoting plane of the chip breaker is the fulcrum, and the root of the chip is the force-exerting point exerting a force acting along the shear plane to increase the shear strain until fracture along the shear plane occurs. A leverage chip breaker is further disclosed which has a chip breaking body having a pivoting plane, a side-flow restricting plane, an up-curl guiding plane and a supplementary pivoting plane.

The chip breaker of the described embodiments of the present invention breaks the chips generated during metal cutting processes including turning, facing, boring, parting and other metal cutting processes in which chip breaking is required, at most combinations of machining conditions including the workpiece material properties, cooling conditions, cutting speed, feed rate and depth of cut, into small pieces in forms of less than one circle of small radius. The chip breaker guides the broken chips to drop gently from the tool main flank to the container of the machine, such that the operational safety, machined workpiece surface quality and chip disposal efficiency are ensured. The chip breaker reduces the force acting on the tool cutting edge by sharing the force acting on the tool rake face, reduces temperature at the tool cutting region by reducing cutting force at the tool rake face and by breaking the chips frequently, and consequently reduces the tool wear rate and increases the tool life. The chip breaker works with inserts of all kinds of shapes and obviates the need for geometries constructed on the tool inserts for chip breaking purposes, such that the cost on tool inserts can be substantially reduced by using flat rake face inserts rather than inserts with complicated geometry at the rake face. The breaker may be constructed with the tool insert, in which the chip breaker body is formed on the tool rake face.

BRIEF DESCRIPTION OF THE DRAWINGS

Embodiments of the invention will now be described, by way of example, with reference to the accompanying drawings, in which.

DESCRIPTION OF THE EMBODIMENTS OF THE INVENTION

Figure 1:
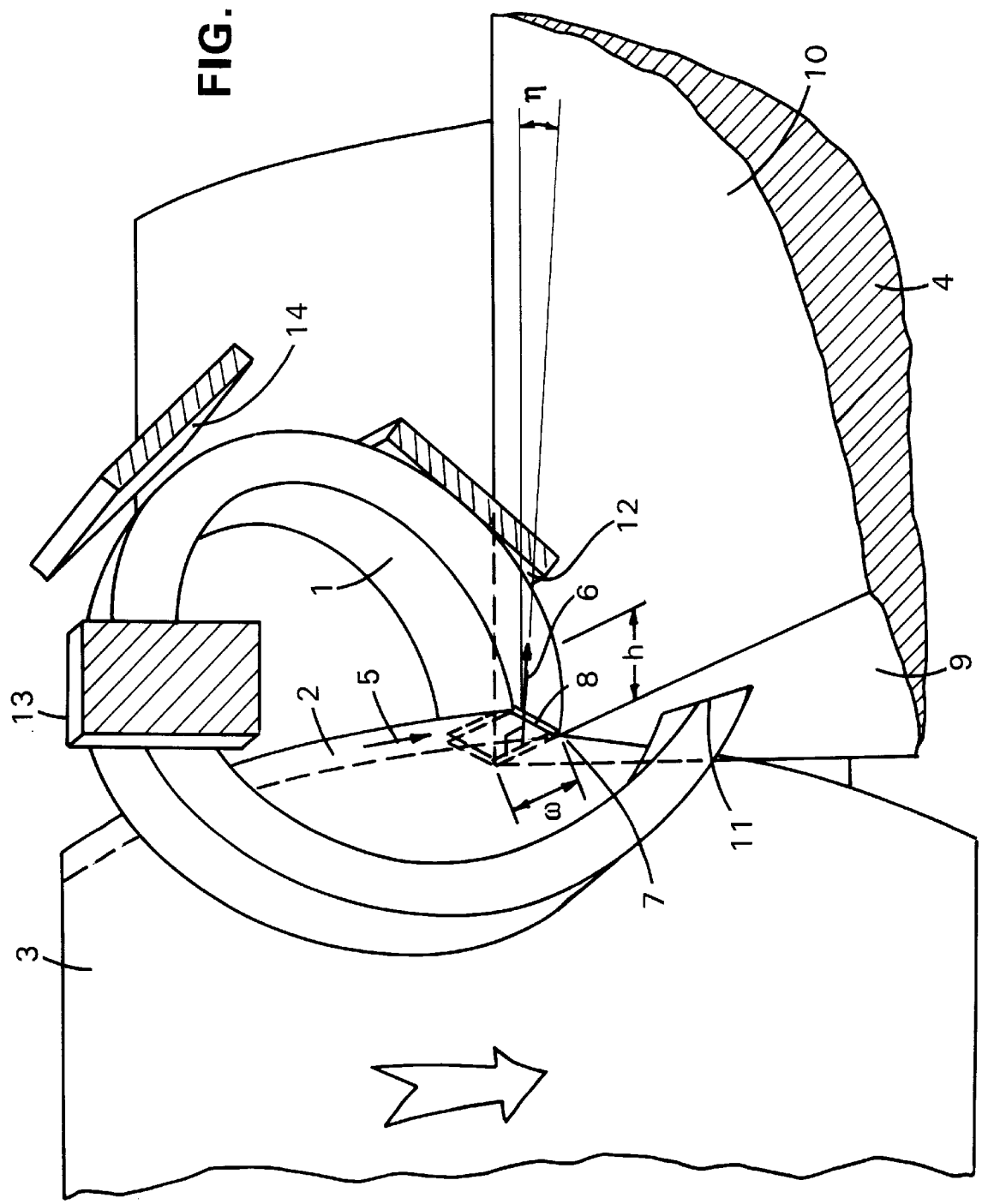
FIG. 1 is an illustration showing an embodiment of the shear plane fracturing method for chip breaking of the present invention.

During a metal cutting process, as shown in FIG. 1, a chip 1 is formed from cutting off a layer of material 2 from the workpiece 3 by the cutting tool 4. The chip formation is a process of material velocity discontinuation, in which the layer of the work material to be cut is forced to change its moving velocity from a velocity indicated by vector 5 to a velocity indicated by vector 6 within a narrow deformation zone 7, the so called "shear plane". At the shear plane the workpiece material is shear stressed and strained, and is formed into the chip flowing along the tool rake face 10.

In a metal cutting process, the shear strain at the shear plane is a constant when the tool rake angle and the shear angle (the angle between the cutting direction and the shear plane) are unchanged. Different materials of the workpiece respond differently to the same value of shear strain at the shear plane. A brittle material tends to fracture at the shear plane after undergoing only a small shear strain and consequently forms discontinuous chips.

Therefore, in cutting of a brittle material, such as a cast iron, discontinuous chips are usually generated and chip breaking is not a problem. A ductile material tends to fracture at the shear plane only after it has undergone a large enough shear strain. How large a strain is enough for the fracture to occur depends on the ductility of the material, which is a function of temperature and strain-rate in the cutting region. The ductility decreases linearly with the temperature and increases linearly with the logarithm of the strain-rate. This nature of the material properties means that at low cutting speeds the ductility decreases with increasing the speed (due to the domination of strain-rate effect), and at high cutting speeds the ductility increases with increasing the speed (due to the domination of the temperature effect). That is, the value of shear strain leading to fracture at the shear plane varies with workpiece material ductility which is a function of cutting speed. For the same material, the value of shear strain leading to fracture at the shear plane is lower in cutting with a coolant compared to in cutting without a coolant, because the cooling reduces the ductility of workpiece material in the cutting region. In general, in cutting of ductile materials, the shear strain at the shear plane due to chip formation is not large enough to cause fracture, and therefore continuous chips are usually generated, although in cutting of some hardened steels with cooling or at low cutting speeds, fracture may occur at the shear plane and discontinuous chips may be generated.

The shear plane fracturing method for chip breaking to be described aims to break the chips generated during metal cutting processes at all machining conditions, regardless of differences in the work material properties, cooling conditions and cutting conditions, by increasing, in addition to the shear strain due to chip formation for work piece material removal, the shear strain at the shear plane to whatever a value is necessary to lead to fracture at the shear plane.

The increasing of the shear strain can be provided by the leverage chip breaking approach of the described embodiments of the present invention. The approach is as shown in FIG 1. The chip 1 is firstly generated from the primary deformation zone (the shear plane 7) and is secondly deformed along its back in contact with the tool rake face 10 by friction at the tool-chip interface. The secondary deformation causes the chip to curl up (because of surface expansion at the back) and flow away from the rake face. Driven by the chip generation at the shear plane 7, the chip flows and then curls further when its head 11 reaches the first fixed (on the tool) plane 12, caused by the force from the shear plane 7 acting on the root 8 of the chip and the reaction force from plane 12 acting on the head 11 of the chip. The chip then flows up until its head 11 reaches the second fixed (on the tool) plane 14. As soon as the head of the chip reaches plane 14, a reaction force from plane 14 acting on the head 11 of the chip will work together with the force from the shear plane acting on the root 8 of the chip to form the chip into a curled form of small radius. The chip then flows along an arc, with slight elastic spring back in its front portion and with its side-flow (caused by the side-curl of the chip) being restricted by the third fixed (on the tool) plane 13, until its head 11 is stopped by the fourth fixed (on the tool) plane 9. As soon as the chip 1 reaches plane 9 with its head 11, it acts as a lever of curled form, in which the head 11 is the load-lifting point receiving a force from plane 9, the contact between the chip 1 and plane 12 is the fulcrum, and the root 8 of the chip, joining the workpiece 3 at the shear plane 7, is the force-exerting point exerting a force additional to the shear force at the shear plane for chip formation until fracture occurs at the shear plane 7.

Detailed description of the embodiments of the chip breaker constructed according to the present invention are as follows.

Figure 2:
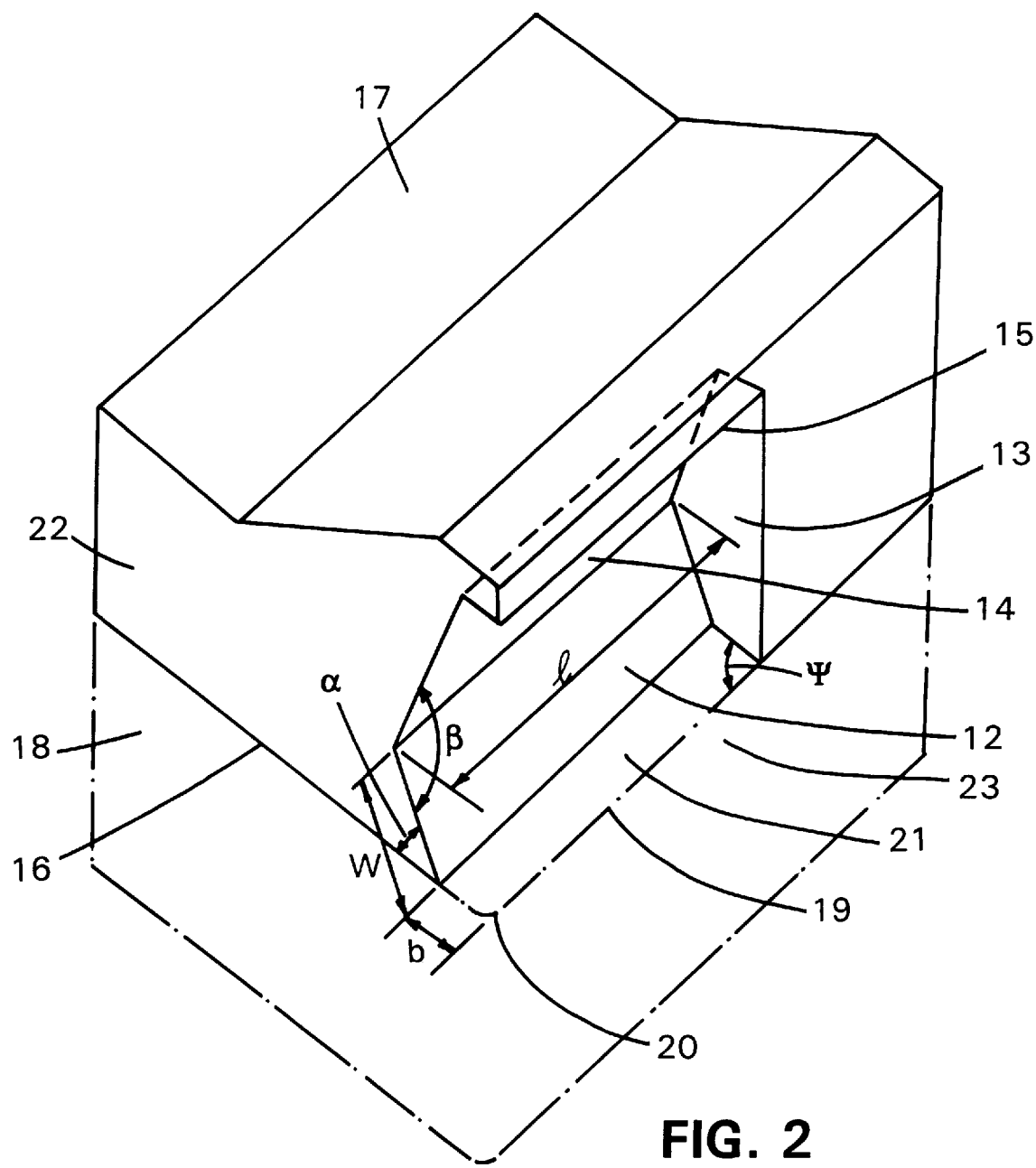
FIG. 2 is a perspective view of one embodiment of the chip breaker constructed according to the present invention showing the structure of the chip breaker for turning with a rectangular tool insert.

FIG. 2 shows a first embodiment of the chip breaker for turning processes. The chip breaker 22 is clamped together with the tool insert 18 on a tool holder. The bottom face 16 of the chip breaker is in contact with the rake face 21 of the tool insert. The clamping face 17 of the chip breaker is in contact with the clamp of the tool holder (not shown). The chip breaking body of the chip breaker is adjacent to the main cutting edge 19, and comprises a pivoting plane 12 which is inclined to the tool rake face 21, a side-flow restricting plane 13 which is approximately perpendicular to cutting edge 19, an up-curl guiding plane 14 and a supplementary reaction plane 15. During cutting, the chip grows from the shear plane and flows along the tool rake face 21 towards plane 12 of the chip breaker, with an up-curl caused by friction and thermal expansion at the tool-chip interface and a side-curl caused by differences in the material flow velocities along the main cutting edge 19 and tool nose 20. Once the head of the chip reaches plane 12, the body of the chip is bent, and the chip is forced to curl further up when it flows over plane 12, with compressed elastic and plastic deformation on the inner-side of the curl and tensile elastic and plastic deformation on the outer-side of the curl. The larger the feed rate of cutting, the bigger the plastic deformation on the two sides of the chip. The plastic deformation will prevent the curled shape of the chip from opening. With the cutting continuing, due to the side-curling of the chip formation process, the chip is pushed such that a side of the chip reaches plane 13, and the side-flow of the chip is then restricted by plane 13. The curled chip will then flow outwards from the chip breaker 22 and then flows down towards the tool main flank. As soon as the head of the chip has reached the tool main flank face 23, it exerts a force on the flank face 23 and at the same time receives a reactive force from the flank face 23. The chip is then acting as a lever of curled form, in which the head of the chip is the load-lifting point receiving a force from the tool flank face 23, the contact between the chip and plane 12 is the fulcrum, and the root of the chip, which joins the workpiece at the shear plane, is the force-exerting point exerting a force additional to the shear force at the shear plane. Since the distance from the fulcrum to the head of the chip is much larger than the distance from the fulcrum to the root of the chip, the force exerted at the shear plane for the additional strain leading to fracture at the shear plane requires only a small load-lifting force applied on the head of the chip. At this stage, if the work material is of low ductility or the feed rate is large, the load-lifting force is not large enough to open up the curled form of the chip before the chip acts as a lever to cause fracture at the shear plane. If the workpiece material is of high ductility or the feed rate is small, however, the chip once has been generated from the shear plane and bent by plane 12 of the chip breaker, is restricted by both planes 13 and 14 to flow up then down towards the tool flank. As soon as the chip head has reached the flank face, it acts as a lever exerting a force at the shear plane as described in the above. In cases like this, there are two possibilities of breaking the chip at the shear plane. If at the head of the chip the load-lifting force required is not large enough to open up the curled chip before the fracture occurs, the chip will be broken as described in the above cases with low ductility of workpiece material or large feed rate. Otherwise, the curled chip will be opened up until the opening is stopped by plane 15. As soon as the body of the chip, which is on the load-lifting side of the lever, has reached plane 15, there will be a frictional force between the chip and plane 15, which is a further load-lifting force of the lever. The lever will then exert a further force from the root of the chip to the shear plane until fracture occurs at the shear plane. As soon as the fracture has occurred, the chip will break at its root, the forces acting on the chip will disappear and the next cycle of chip generating and breaking will start. The broken chip will then be pushed at its root by the head of the next chip in generation, towards the tool flank, and will drop downwards from the tool flank, before the head of the next chip reaches the tool main flank face 23.

The broken chips generated in this way are in the shape of a "9". If the cutting feed rate is large, there is a possibility that as soon as the fracture has occurred, the fracturing zone which binds the broken chip and the new chip growing from the shear plane will be pushed out by the new chip and broken on its way towards to the tool flank when it is bent by the opening of the arc formed by the broken chip and the new ship. The opening is caused by the reactive force on the head of the broken chip. At the mean time for the opening, the arc formed by the broken chip and new chip may work as a lever to fracture the new chip at its root (the shear plane). The new fracturing zone will then be pushed out to start another chip breaking cycle, while the old fracturing zone is bent and broken. The broken chips generated in this way are in the shape of a "c".

Figure 3:
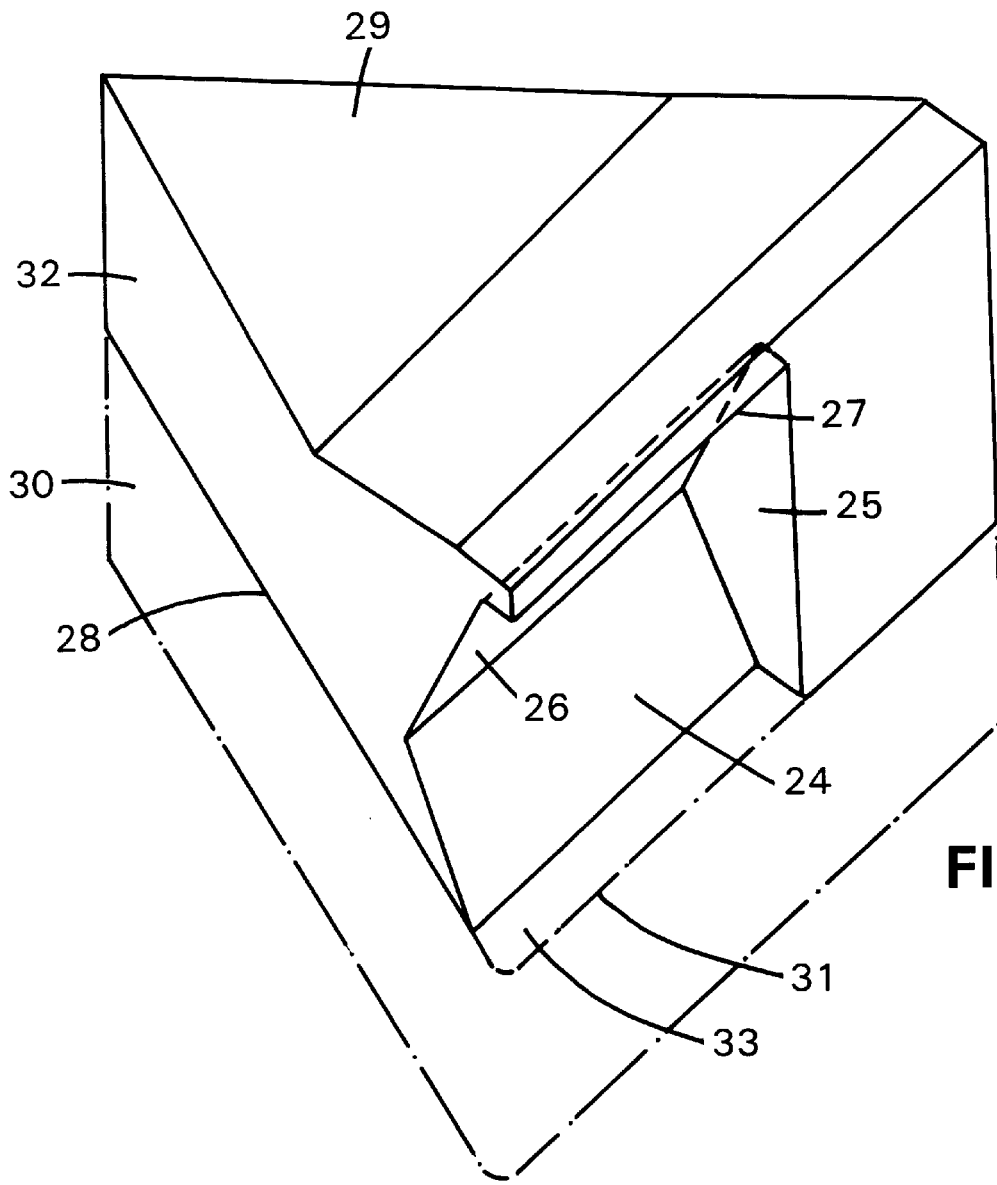
FIG. 3 is a perspective view of a second embodiment of the chip breaker constructed according to the present invention showing the structure of the chip breaker for turning with a non-rectangular tool insert.

FIG. 3 shows a second embodiment of the chip breaker of the present invention, for turning with a triangular tool insert 30. The bottom face 28 of the chip breaker 32 is in contact with the tool rake face 33. The clamping face 29 of the chip breaker is in contact with the clamp of the tool holder (not shown). The chip breaking body of the chip breaker is the same as that of the embodiment shown in FIG. 2, which comprises a pivoting plane 24, a side-flow restricting plane 25, an up-curl guiding plane 26 and a supplementary pivoting plane 27. The chip breaking mechanism of this embodiment is the same as the one shown in FIG. 2.

Compared the embodiments of the chip breaker shown in FIGS. 2 and 3, it can be seen that embodiments in different shapes of the chip breaker can be constructed according to the present invention, which suit the shape of the tool inserts used but share the same chip breaking body.

Figure 4:
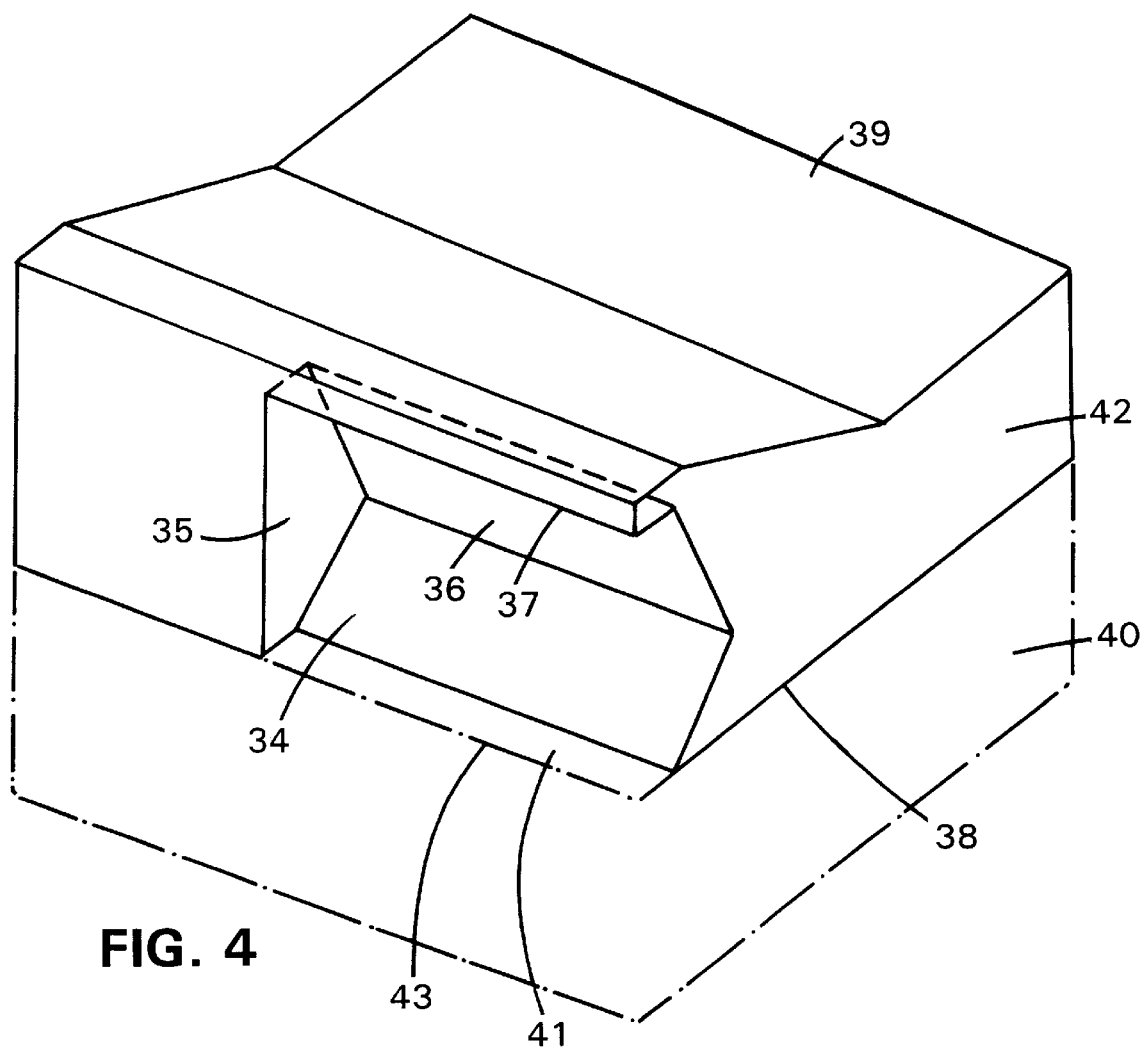
FIG. 4 is a perspective view of a third embodiment of the chip breaker constructed according to the present invention showing the structure of the chip breaker for facing or boring with a rectangular tool insert.

FIG. 4 shows another embodiment of the chip breaker of the present invention, for facing or boring processes with a rectangular insert 40. The bottom face 38 of the chip breaker 42 is in contact with the tool rake face 41. The clamping face 39 of the chip breaker is in contact with the clamp of the tool holder (not shown). The chip breaking body of the chip breaker is the same as the one in the embodiment shown in FIG. 2, which comprises a pivoting plane 34, a side-flow restricting plane 35, an up-curl guiding plane 36 and a supplementary pivoting plane 37. The chip breaking mechanism of this embodiment is the same as the one shown in FIG. 2.

Compared the embodiments of the chip breaker shown in FIGS. 2 and 4, it can be seen that embodiments of the chip breaker for cutting processes other than turning can be constructed according the present invention, which share the same chip breaking body but locate it differently.

Figure 5:
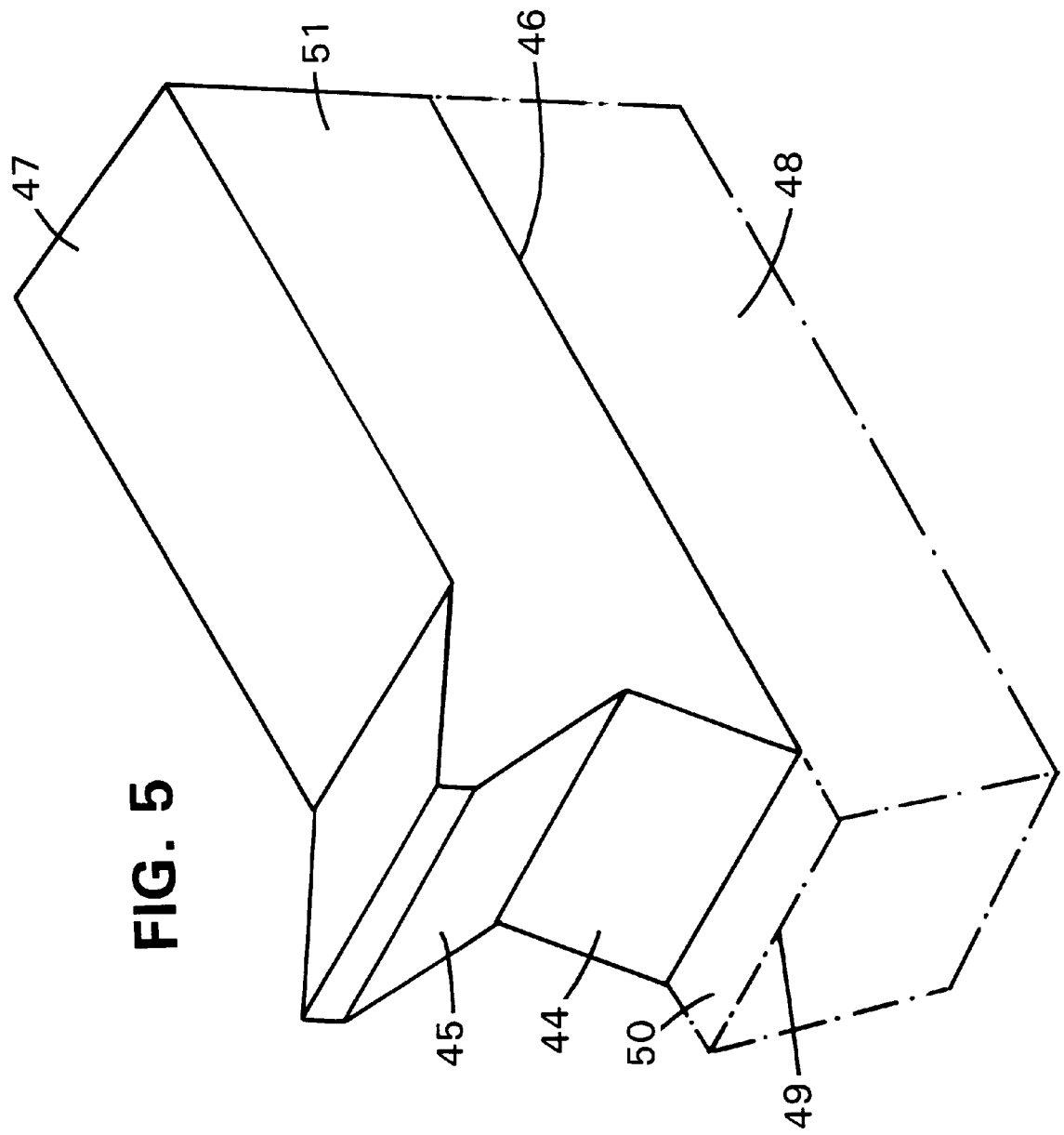
FIG. 5 is a perspective view of a fourth embodiment of the chip breaker constructed according to the present invention showing the structure of the chip breaker for parting with a parting tool insert.

FIG. 5 shows another embodiment of the chip breaker of the present invention, for use with a parting tool insert. The bottom face 46 of the chip breaker 51 is in contact with the rake face 50 of the tool insert 48. The clamping face 47 of the chip breaker is in contact with the clamp of the tool holder (not shown). The chip breaking body of the chip breaker is adjacent the main cutting edge 49, and comprises a pivoting plane 44 and a supplementary reaction plane 45. During cutting, the chip grows from the shear plane and flows along the tool rake face 50 towards pivoting plane 44 of the chip breaker, with up-curling caused by friction and thermal expansion at the tool-chip interface. As soon as the head of the chip has reached plane 44, the body of the chip will be bent to curl up, with compressed elastic and plastic deformation on the inner-side of the curl and tensile elastic and plastic deformation on the outer-side of the curl. The larger the feed rate of cutting, the bigger the plastic deformation on the two sides of the chip. The plastic deformation will prevent the curled shape of the chip from opening. With the chip being continuously generated from the shear plane and bent to curl up when it flows over plane 44, the head of the chip will reach the workpiece surface to be machined. As soon as the head has reached the workpiece surface, it will exert a force on the workpiece and at the same time receive a force from the workpiece. The chip body is then formed into a lever of curled form, in which the head of the chip is the load-lifting point receiving a force from the workpiece, the contact between the chip and plane 44 is the fulcrum, and the root of the chip is the force-exerting point exerting a force additional to the shear force at the shear plane. Since the distance from the fulcrum to the head is much larger than the distance from the fulcrum to the root, the force exerted to the shear plane for the additional strain leading to fracture at the shear plane requires only a small load-lifting force applied on the head of the chip. If the load-lifting force is not large enough to open up the curled form of the chip before the chip acts as a lever to cause fracture at the shear plane, the chip will be broken and the next cycle of chip breaking will start. Otherwise, the curled chip will be opened up by the load-lifting force until the opening is stopped by plane 45. As soon as the body of the chip, which is on the load-lifting side of the lever, has reached plane 45, there will be a frictional force between the chip and plane 45, which is a further load-lifting force on the lever. The lever will then exert a further force from the root of the chip to the shear plane until fracture occurs at the shear plane. As soon as the fracture has occurred, the chip will break at its root, forces acting on the chip will disappear, and the next cycle of chip generating and breaking will start. The broken chip will then be pushed at its root by the head of the next chip in generation towards the workpiece surface to be machined and brought by the workpiece to drop downwards to the chip container of the machine, before the head of the next chip reaches the workpiece surface to be machined.

Figure 6:
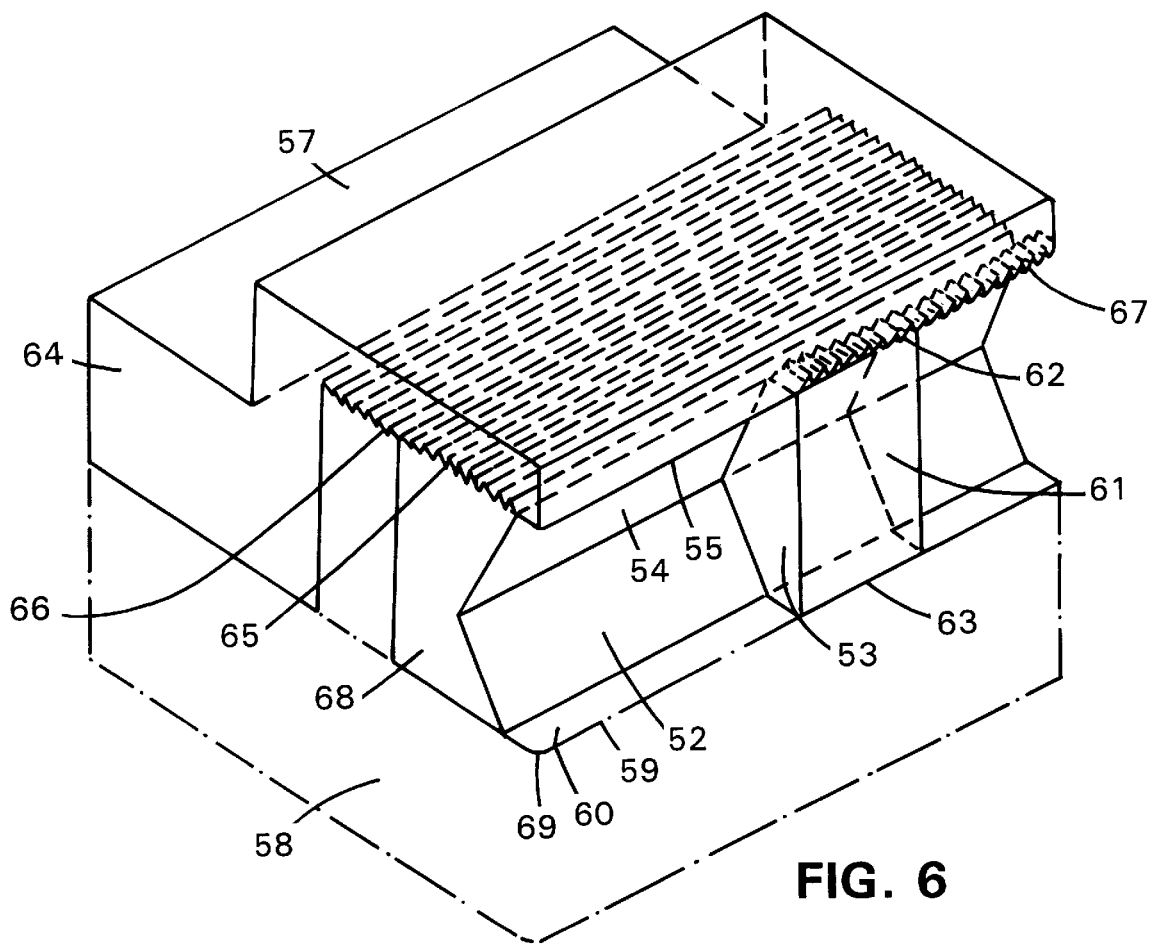
FIG. 6 is a perspective view of a fifth embodiment of the chip breaker similar to that shown in FIG. 2, with an adjustable chip breaking body.

From the above descriptions of embodiments of the chip breaker, it can be seen that the dimensional values of the chip breaking body in the chip breaker can be varied within a range without losing effectiveness in chip breaking. However, the shape of the broken chip might vary with the ratio of the depth of cut to the distance from the tool nose 20 to the side-flow restriciting plane 13 as shown in FIG. 2, and the radius of the chip curl might vary with the ratio of the feed rate to the distance from the tool main cutting edge 19 to the pivoting plane 12 as shown in FIG. 2. Therefore, in one preferred form, the dimensional values of the chip breaking body may be adjustable. FIG. 6 shows a fifth embodiment of the chip breaker of the present invention, with the chip breaking body being adjustable. The clamping surface 57 of the chip breaker 64 is in contact with the clamp of the tool holder. The chip breaking body is formed by an adjustable body 68 comprising a first surface forming a pivoting plane 52 and a second surface forming an up-curl guiding plane 54, an adjustable side-flow restricting body 61 having a surface forming a side-flow restricting plane 53, and the body of the chip breaker 64 having a surface forming a supplementary reaction plane 55. The distance from the tool cutting edge 59 to the pivoting plane 52 can be adjusted by adjusting the location of the saw-shaped teeth 65 of the chip bending body 68, over the saw-shaped teeth 66 of the body of the chip breaker. Similarly, the distance between the tool nose 69 to the side-flow restricting plane 53 can be adjusted by adjusting the location of the saw-shaped teeth 62 of the side-flow restricting body over the saw-shaped teeth 67 of the body of the chip breaker. The position of supplementary reaction plane 55 may be varied by adjusting the relative position of chip breaker body 64 and tool insert 58. Besides the structure as shown in FIG. 6, other methods of fixing and adjusting can also be used to construct the adjustable chip breaker body of the chip breaker according to the present invention. The same adjustable chip breaking body can also be constructed on other embodiments of the chip breaker shown in FIGS. 3, 4 and 5.

Figure 7:
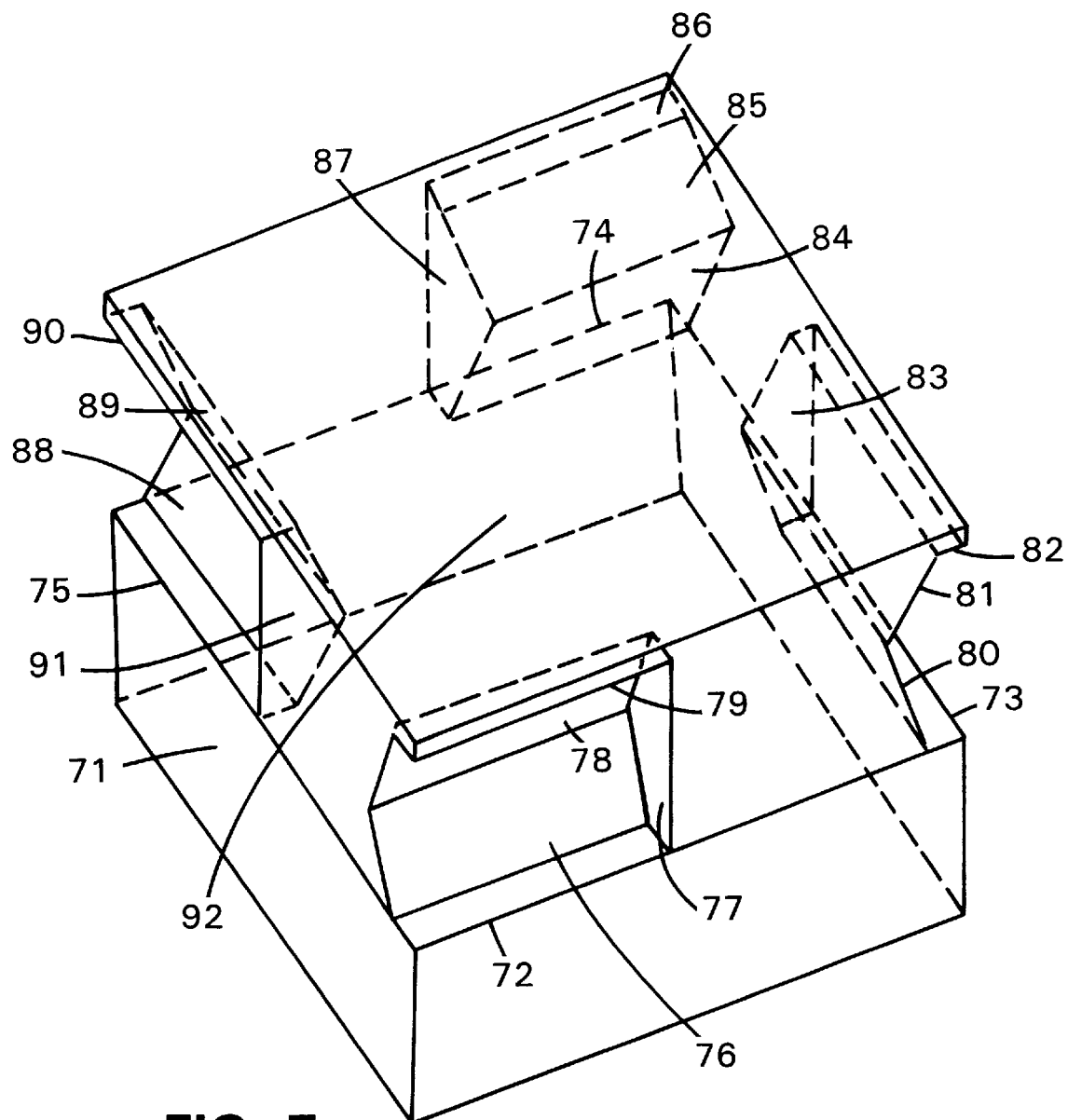
FIG. 7 is a perspective view of a sixth embodiment of the chip breaker constructed according to the present invention showing the structure of a chip breaker tool insert of the present invention.

FIG. 7 shows a sixth embodiment of the chip breaker of the present invention, in which four chip breaking bodies of the present invention are constructed on the top of a tool insert to form a chip breaker insert 71. The chip breaker insert has four cutting edges 72, 73, 74 and 75 to be in turn used as a main cutting edge in cutting processes. A chip breaking body as described in FIG. 2, comprising planes 76, 77, 78 and 79, is constructed to work with the cutting edge 72. Another chip breaking body as described in FIG. 2, comprising planes 80, 81, 82 and 83, is constructed to work with the cutting edge 73. Another chip breaking body as described in FIG. 2, comprising planes 84, 85, 86 and 87, is constructed to work with the cutting edge 74. Another chip breaking body as described in FIG. 2, comprising planes 88, 89, 90 and 91, is constructed to work with the cutting edge 75. The clamping surface 92 is in contact with the tool holder clamp (not shown). The chip breaking body of the chip breaker as described in FIG. 2 can be constructed, by varying its geometrical parameters, in many forms to suit the needs of practical application of the chip breaker or to meet production requirements. The geometrical parameters of the chip breaking body include (see FIG. 2):

1) the angle between the tool rake face 21 and the pivoting plane 12 of the chip breaking body, $\alpha$,
2) the distance from the tool main cutting edge to the pivoting plane 12 of the chip breaking body, b,
3) the width of the pivoting plane 12, w,
4) the angle between the pivoting plane 12 and the up-curl guiding plane 14, $\beta$,
5) the length of the upper-side of the pivoting plane which joins with the lower-side of the up-curl guiding plane, l, and
6) the angle between the side-flow restricting plane 13 of the chip breaking body and the tool main cutting edge 19, $\Psi$.

In the chip breaking body of the chip breaker as shown in FIG. 2, for simplicity, the angle $\Psi$ is designed to be approximately perpendicular to the tool main cutting edge. An optimum value for this angle should be determined according to the chip side-flow angle $\eta$ which is commonly defined as the angle between the flow direction of the chip at the cutting region and the normal to the cutting edge in the rake face of the tool (see FIG. 2). The value of $\Psi$ should be determined such that, during the chip formation and breaking process, the chip can flow out from the chamber of the chip breaking body and on the other hand its side-flow is restricted by the side-flow restricting plane 13 so that the leverage chip breaking process of the present invention can be achieved. Therefore, an optimum design for the angle $\Psi$ should follow the equation $$\Psi = 90° - \eta \quad (1)$$

In view of the fact that the chip side-flow angle $\eta$ varies with machining conditions, especially with the combination of the radius of the tool corner, feed rate and depth of cut (when the radius of the tool corner varies from 0.4 to 1.2, feed rate varies from 0.1 to 0.3 and depth of cut varies from 0.3 to 4, the chip side-flow angle varies within the range from 5 degrees to 70 degrees), for simplicity, the angle $\Psi$ can be assigned with a fixed value which is calculated from equation (1) using a usual value of the chip side-flow angle.

Figure 8:
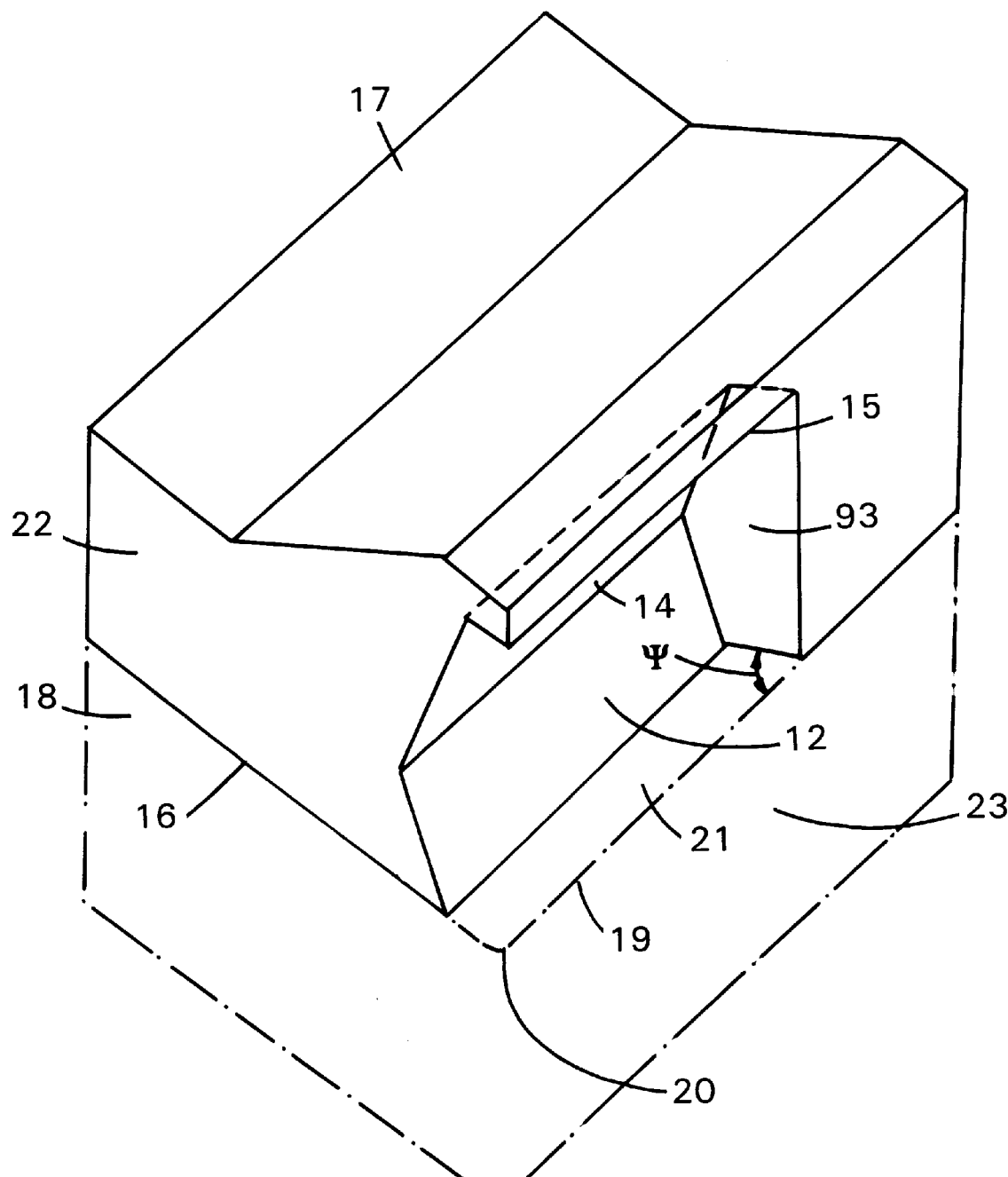
FIG. 8 is a perspective view of a seventh embodiment of the chip breaker constructed according to the present invention showing a variation of the chip breaking body of the chip breaker as shown in FIG. 2.

FIG. 8 shows a seventh embodiment of the chip breaker of the present invention similar to FIG. 2, having an angle $\Psi$ different from 90 degrees. In this embodiment the side-flow restricting plane 93 of the chip breaking body in the chip breaker 22 is perpendicular to the tool rake face 21, and the angle between the plane 93 and the tool main cutting edge 19 is less than 90 measured clockwise from the tool cutting edge 19.

A design for the chip breaking body of the present invention without having the supplementary reaction plane 15 as shown in FIG. 2 can be constructed by properly determining the geometrical parameters α, b, w, l and β of the chip breaking body, using the correlations between the geometrical parameters of the chip breaking body, machining conditions and radius of the broken chips, such that the chip, when it flows out from the chamber formed by the pivoting plane 12, side-flow restricting plane 13 and up-curl guiding plane 14, is highly strain-hardened in curled form of small radius, thus the supplementary reaction plane 15 is not needed in the chip breaking process because the chip under such condition will not be opened up to touch the supplementary plane 15 before fracture caused by the leverage chip breaking process occurs at the shear plane.

Expressions for the correlation between the geometrical parameters of the chip breaking body, machining conditions and radius of the broken chips can be derived from the geometry of the chip breaking body at the cutting region. By neglecting the elastic spring back of the chip, the correlation between the radius of a chip broken by the chip breaker, r, and the parameters b and β can be represented by the equation $$r = \frac{b - h}{\tan\frac{\alpha}{2}} \quad (2)$$

where h is the tool-chip contact length (see FIG. 2) resulted from machining conditions, namely the feed rate, tool rake angle and workpiece material flow stress properties which are functions of strain-rate and temperature. The smaller the value for b, the smaller the radius of the chip. However, b must be larger than h to allow the chip to be generated naturally from the cutting region. An increase in the angle α will decrease the radius of the chip, but on the other hand it will also, during the leverage chip breaking process, decrease the force component exerting from the root of the chip to the shear plane, which is to be avoided.

The smaller the values for W and β, the smaller the radius of the chip and also the smaller the size of the chip breaking body. However, W and β have to be large enough to allow the chip flow out from the chamber of the chip breaking body. The inventor has found that $$b \leq w \leq 5b \quad (3)$$

and $$90° \leq \beta \leq 130° \quad (4)$$

The length l has to be determined such that the chip side-flow is restricted by the side-flow restricting plane 13 (see FIG. 2) to be within the limit required by the leverage chip breaking process, and on the other hand the chip can flow out from the chip breaking body. The length l should fall in the range:

$$d \leq l \leq 10d \quad (5)$$

where d is the width of cut (see FIG. 2).

Figure 9:
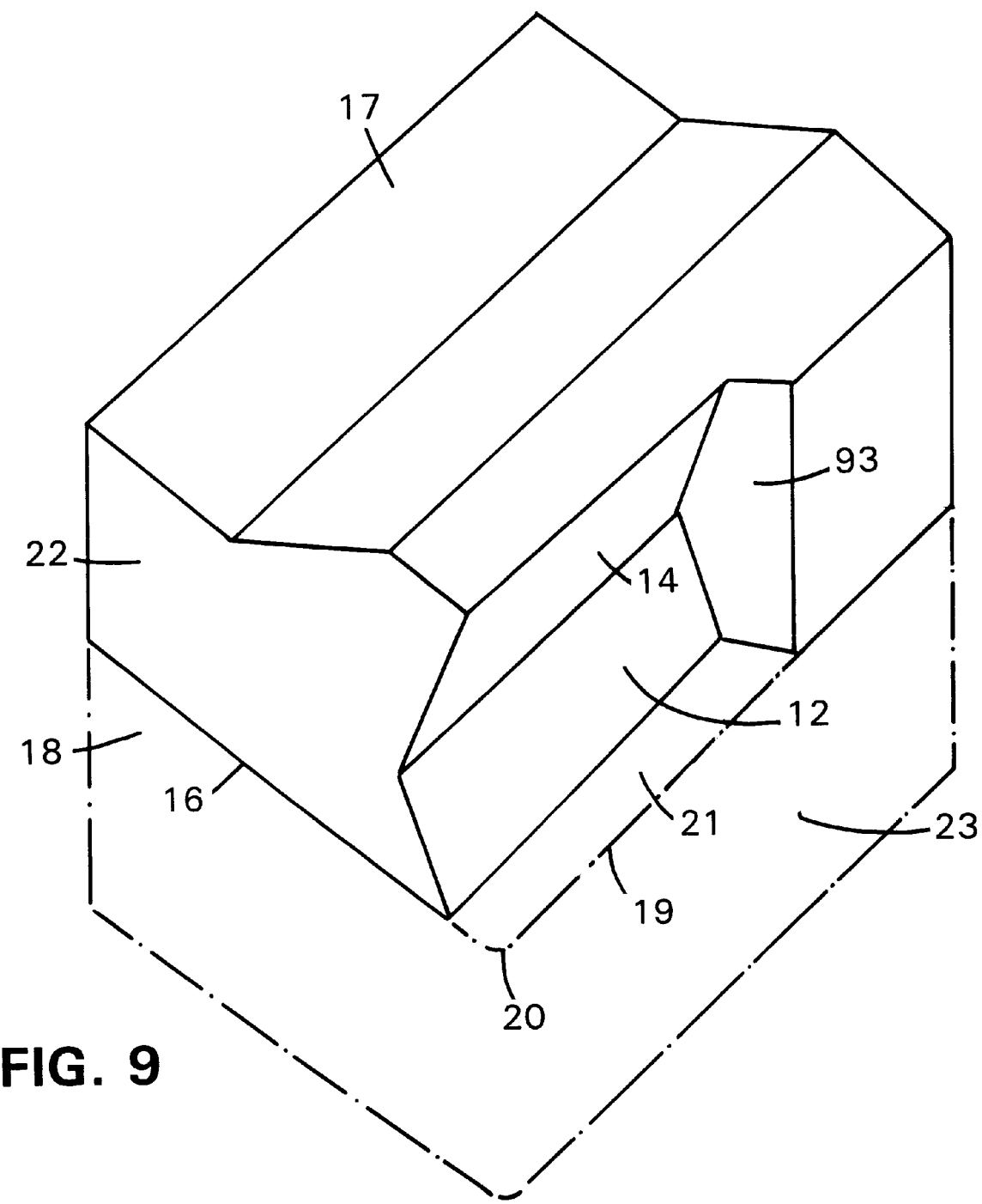
FIG. 9 is a perspective view of a eighth embodiment of the chip breaker constructed according to the present invention showing another variation of the chip breaking body of the chip breaker as shown in FIG. 2.

FIG. 9 shows a eighth embodiment of the chip breaker of the present invention, showing another design of the chip breaking body in the chip breaker as shown in FIG. 2. In this embodiment the chip breaking body in the chip breaker 22 is formed by the pivoting plane 12, the side-flow restricting plane 93 and the up-curl guiding plane 14. The supplementary reaction plane 15 as shown in FIG. 2 is not included in the chip breaking body. In such a design, the geometrical parameters of the chip breaking body, α, b, w, l, and β, are determined, using expressions (2), (3), (4) and (5), such that the chip, when flow out from the chip breaking body, is highly strain-hardened in curled form of small radius and with its side-slow being restricted by the side-flow restricted plane 93. Therefore, the supplementary reaction plane 15 as shown in FIG. 2 is not needed in this design.

Figure 10:
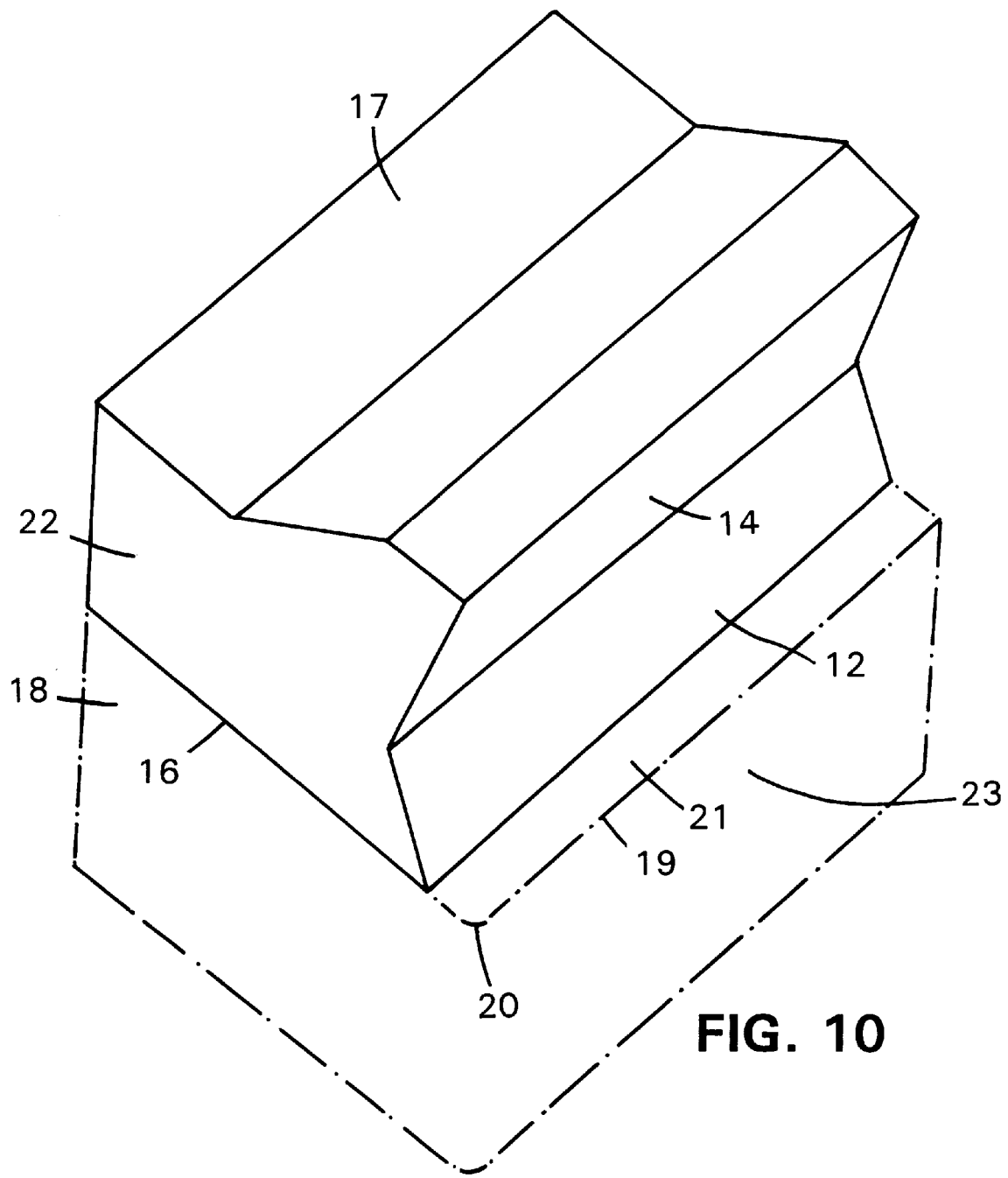
FIG. 10 is a perspective view of a ninth embodiment of the chip breaker constructed according to the present invention showing another variation of the chip breaking body of the chip breaker as shown in FIG. 2.

In the design of the chip breaking body as shown in FIG. 9, the side-flow restricting plane 93 is not needed in cutting under certain ranges of machining conditions, in which the chip, when it flows out from the corner formed by the pivoting plane 12 and up-curl guiding plane 14, is highly strain-hardened in curled form of small radius with its side-flow being naturally (without being restricted by the side-flow restricting plane) under the limit required by the leverage chip breaking process. One of the examples under the certain ranges of machining conditions stated above is in turning of low carbon steels at the feed rate equal to and larger than 0.15 mm/rev when the ratio of the radius of the tool corner to the width of cut is less than or equal to 0.5. In such cutting cases, the side-flow restricting plane 93 as shown in FIG. 9 is not needed for chip breaking, and it can be removed from the design of the chip breaking body to simplify the structure of the chip breaker. This is illustrated in FIG. 10 which shows a ninth embodiment of the chip breaker of the present invention, showing another modification of the chip breaking body in the chip breaker shown in FIG. 2. In this embodiment the chip breaking body is formed only by two planes, the pivoting plane 12 and the up-curl guiding plane 14.

Figure 11:
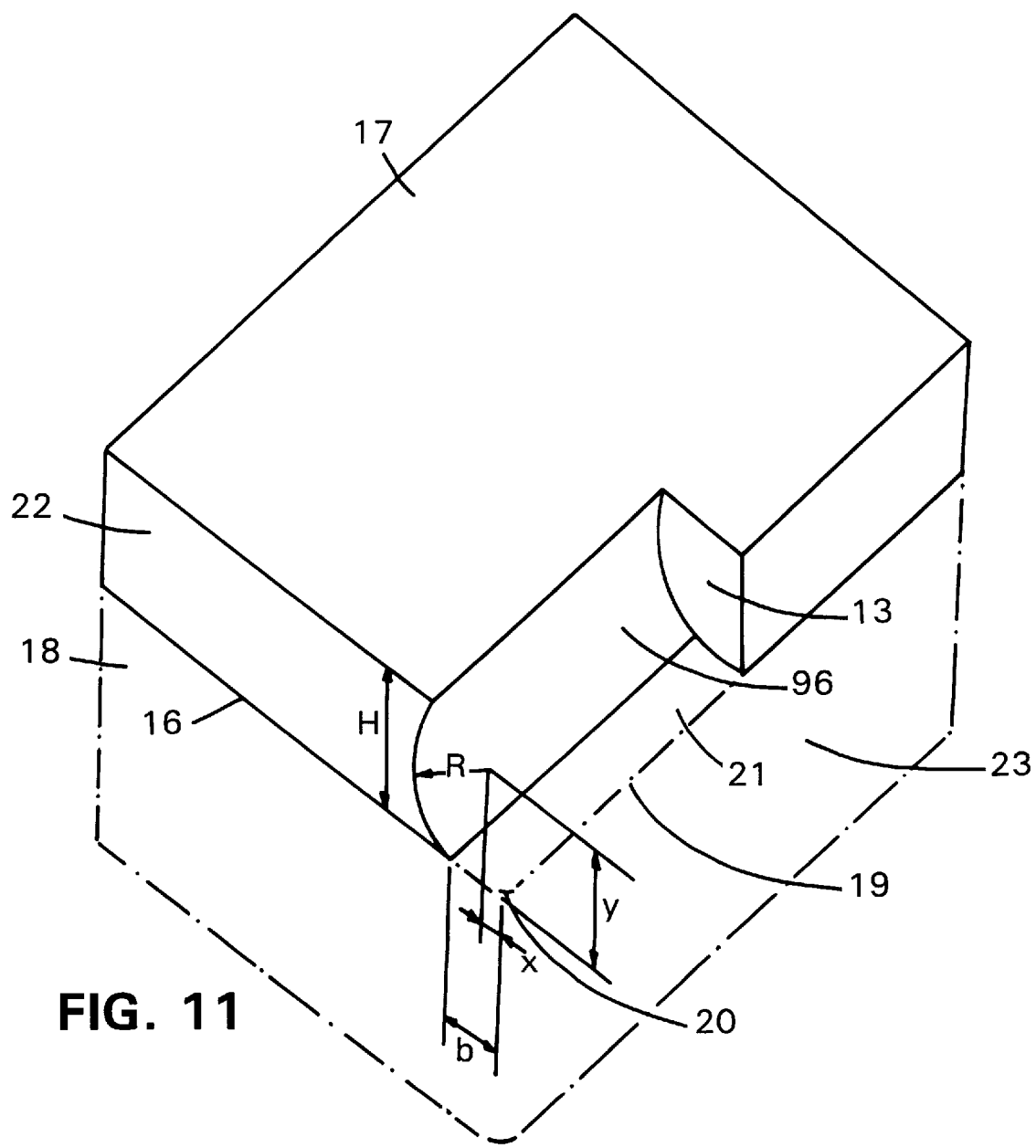
FIG. 11 is a perspective view of a tenth embodiment of the chip breaker constructed according to the present invention showing another variation of the chip breaking body of the chip breaker as shown in FIG. 2.
Figure 12:
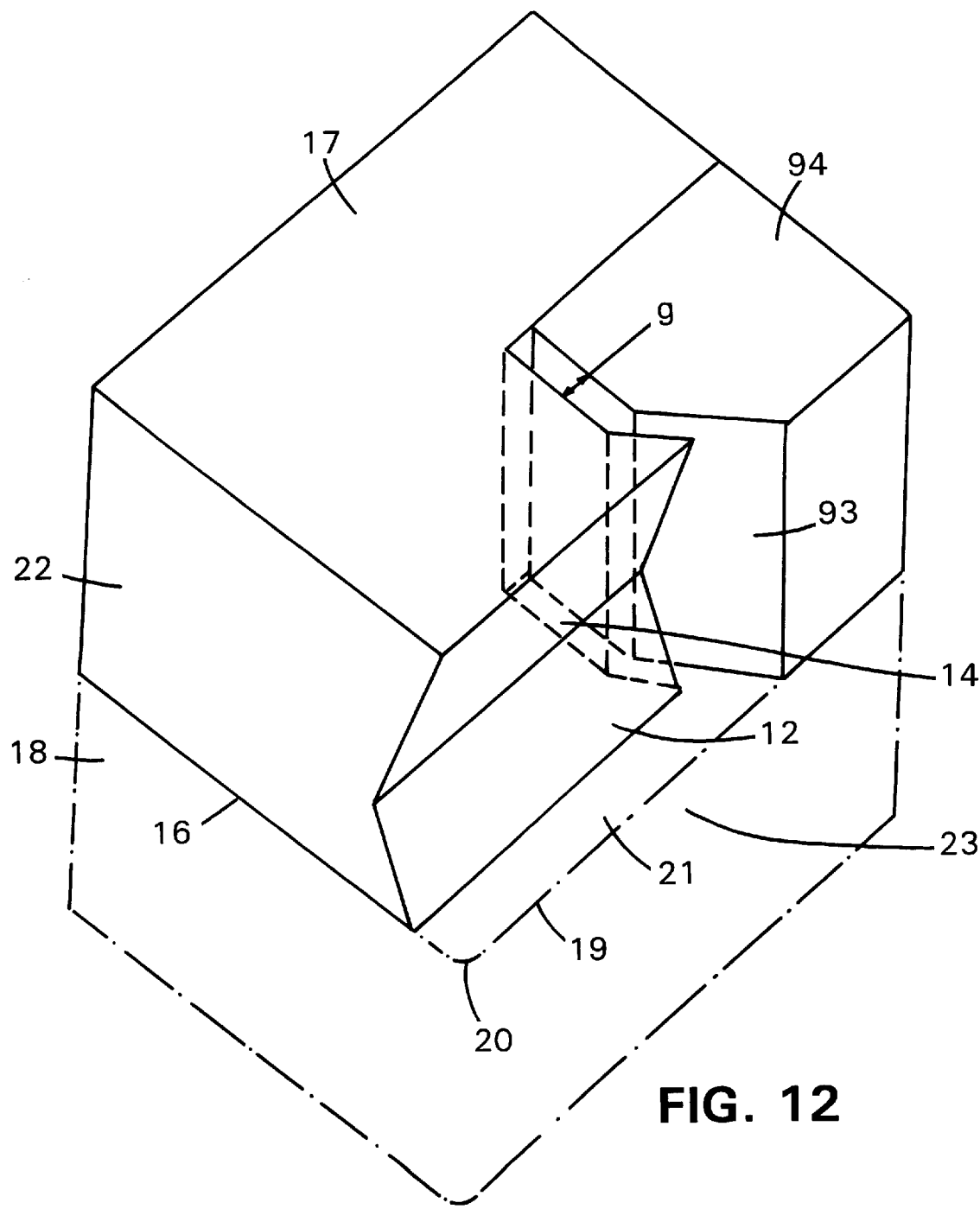
FIG. 12 is a perspective view of an eleventh embodiment of the chip breaker of the present invention showing another variation of the chip breaking body of the chip breaker as shown in FIG. 2.

To ensure the chip is broken by the leverage chip breaking method, the curl-up guiding plane 14 shown in FIG. 10 cannot be removed for further simplification based on the structural design as shown in FIG. 10, because plane 14 is necessary to ensure that the chip is formed into a lever for chip breaking. However, the pivoting plane 12 and up-curl guiding plane 14 in the chip breaker design as shown in FIG. 11 can be combined into an up-curl guiding and pivoting surface which is designed such that it provides both the up-curl guiding function for forming the chip into a level of curled form and the pivoting function for the leverage chip breaking process. FIG. 12 shows a tenth embodiment of the chip breaker of the present invention, showing another design of the chip breaking body in the chip breaker as shown in FIG. 2. In this design, the chip breaker 22 has a chip breaking body formed by a side-flow restricting plane 13 and an arcuate up-curl guiding and pivoting surface 96. The parameter b is the same as the one shown on FIG. 2. The radius R, height H and the centre co-ordinates x and y for the arcuate surface 96 is determined such that surface 96 will work together with the side-flow restricting plane 13 to form the chip into a lever of curled form, and as soon as the head of the chip has received a reaction force, it will work, through the contact of the plane 96 with the back of the chip, as the fulcrum for pivoting in the leverage chip breaking process. As an example for designing the arcuate up-curl guiding and pivoting surface 96, in turning of low carbon steels at cutting speeds from 100 m/min to 300 m/min, feed rates from 0.03 mm/rev to 0.3 mm/rev, the parameters R, H, x and y can be from 1.5 mm to 5 mm, from 1 mm to 6 mm, from 0 mm to 0.5 mm and from 1 mm to 6 mm, respectively.

In the production of the chip breaker of the present invention, if the chip breaker is produced not by compression and sintering but by machining, the production of the chip breaking body as shown in FIG. 2 may be difficult and costly. An assembled design for the chip breaking body can avoid such production problems. This is shown in FIG. 12 which shows an eleventh embodiment of the chip breaker of the present invention, being another modification of the chip breaking body in the chip breaker as shown in FIG. 2. In this embodiment the chip breaking body is in an assembled chip breaker comprises the main part 22 and a separate part 94. The chip breaking body is formed by the pivoting plane 12, up-curl guiding plane 14 and side-flow restricting plane 93. The planes 12 and 14 are on the main part 22. Plane 93 is on the separate part 94. There is a gap g between the main part 22 and the separate part 94. By varying the value of g the position and effectiveness of plane 93 can be adjusted. The assembled chip breaker is pressed on the top of the tool insert 18 by the clamp (not shown) of the tool holder (not shown). The clamp engages on both the top 17 of the main part and the top 95 of the separate part of the assembled chip breaker.

The manufacturing of the chip breaker involves only simple processes of machining and surface hardening in the case of tool steel manufacturing materials, or compression and sintering in the case of tungsten carbide or ceramic manufacturing materials.

In the present drawings only embodiments of the chip breaker constructed according to the present invention have been illustrated for some lathing processes. This is because problems caused by continuous chips in those processes are more serious compared to other metal cutting processes, such as milling. However chip breakers of the present invention are applicable for other metal cutting processes.

In the above described drawings, only embodiments of the chip breaker for cutting with flat rake face insert tools using tool holders with a clamp on top of the chip breaker have been illustrated. This is not to be construed as limitative and chip breakers with other ways of being clamped, such as having a hole in the body of the chip breaker for locating the clamp or for fixing the chip breaker together with the tool insert on the tool holder, can be constructed according to the present invention. It is also possible to construct the chip breaker together with a tool insert to form a chip breaker insert of the present invention, which combines at least one chip breaking body of the present invention and the tool insert.

The chip breaker of this invention works under machining conditions with and without a coolant. In dry cutting with the chip breaker, the chip will be broken into small pieces of less than one circle; when a coolant is applied to cutting with the chip breaker, the chip will still be broken into small pieces in less than one circle, which is similar to dry cutting, and the radii of the broken chip circles will be smaller and more consistent compared to those in dry cutting, because the ductility of the chip material is reduced by cooling.

In general, although the surfaces of the chip breaker have been shown planar (except for surface 96 in FIG. 11), they may be of other surface shapes provided they can still provide their functions in the chip leverage process.

I claim:

1. Apparatus for breaking chips in a metal cutting process in which a chip is parted from a workpiece at a shear plane of chip formation by forming the chip into a lever for exerting a force to increase shear strain at the shear plane until fracture occurs at the shear plane, said apparatus comprising:

lever forming means comprising a pivoting surface and a reaction surface,
the pivoting surface being defined by a breaker body and positioned for flowing the chip upward towards the reaction surface and forming a fulcrum point for contact with the chip, said apparatus further comprising:
a guiding surface disposed between said pivoting surface and the reaction surface and positioned for guiding a chip to flow towards said reaction surface,
a side-flow restricting surface positioned for restricting sideways flow of the chip, and
a tool main cutting edge, the angle $\Psi$ between the side-flow restricting surface and the tool main cutting edge being represented by the equation:

$$\Psi = 90° - \eta$$

where $\eta$ represents chip side-flow angle.

2. Apparatus for breaking chips as claimed in claim 1, wherein said side-flow restricting surface is defined by said breaker body.

3. Apparatus for breaking chips as claimed in claim 1, wherein said side-flow restricting surface is defined by a side-flow restricting body.

4. Apparatus for breaking chips as claimed in claim 3, wherein said side-flow restricting body defining said side-flow restricting surface has an adjustable position along said main tool cutting edge.

* * * * *